(No Model.)
W. HESTON.
COMBINED TOOL FOR RAKING, HOEING, SHOVELING, AND PITCHING.
No. 334,438. Patented Jan. 19, 1886.
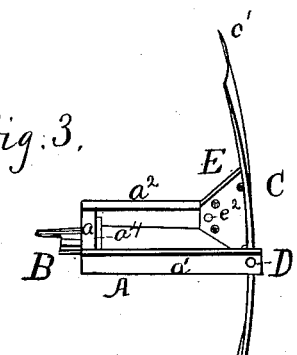
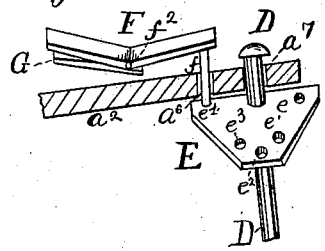
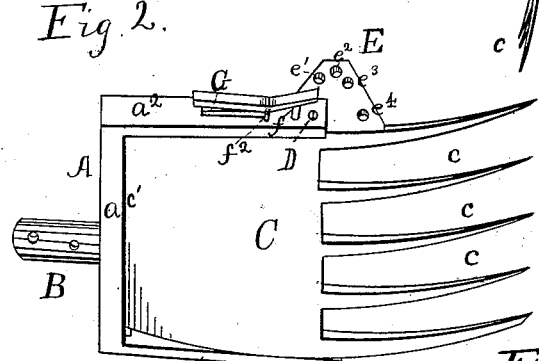
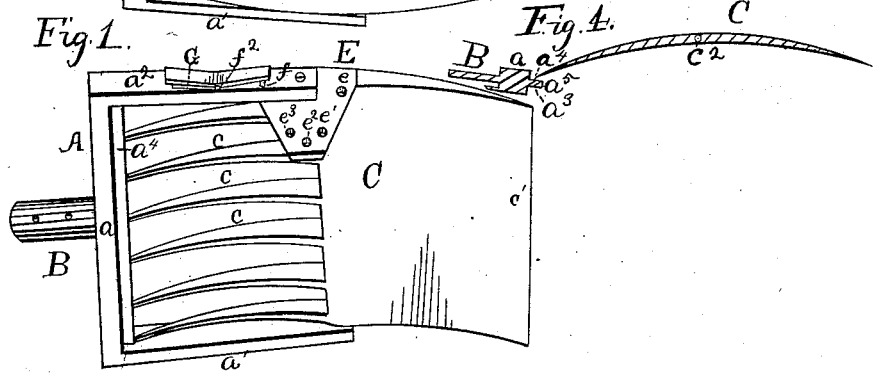
Witnesses.
N. A. Haseltine.
J. S. Haseltine
Inventor.
Watson Heston by
S. A. Haseltine & Bro.
Att'ys

UNITED STATES PATENT OFFICE.

WATSON HESTON, OF CARTHAGE, MISSOURI.

COMBINED TOOL FOR RAKING, HOEING, SHOVELING, AND PITCHING.

SPECIFICATION forming part of Letters Patent No. 334,438, dated January 19, 1886.

Application filed April 9, 1885. Serial No. 161,675. (No model.)

*To all whom it may concern:*

Be it known that I, WATSON HESTON, a citizen of the United States, residing at Carthage, in the county of Jasper and State of Missouri, have invented certain new and useful Improvements in Combined Tools for Hoeing, Shoveling or Spading, Pitching, and Raking; and I do hereby declare the following to be a full, clear, and exact description of the invention, such as will enable others skilled in the art to which it appertains to make and use the same.

My invention relates to improvements in the combined tool, forming a spade or shovel, fork, hoe, and rake, the object of which is to provide a cheap, simple, durable, and convenient device for general horticultural, garden, and other work. These objects I attain by means of the device illustrated in the accompanying drawings, forming a part of this specification, in which—

Figure 1 is a view in elevation showing the device as a spade. Fig. 2 is a similar view showing the device arranged as a fork. Fig. 3 is also a view in elevation showing the device arranged as a rake and hoe. Figs. 4 and 5 are detailed views.

Similar letters of reference indicate corresponding parts in the several figures.

A is a clevis-shaped frame, formed of two arms, $a'$ $a^2$, and a head-piece, $a$, to which may be secured a shank, but, preferably, a ferrule, B, forming a part of the frame A. This ferrule B is provided with the usual holes for securing a handle of any desired size and shape. The head-piece $a$ is provided with grooves $a^3$ $a^4$, forming a tongue, $a^5$, thus forming a firm support and protector for the back end of the blade when used as a spade or fork, thus permitting the operator to drive the fork or spade into the earth or other desired substance, by placing the foot upon the back edge of the head-piece $a$. Each of the arms is provided with holes $a^7$, to receive a bolt or pins, D, on which the blade and tines are pivoted.

C is a blade, preferably formed concave on one side and convex on the other, the better to serve the purposes of the four implements. It has a sharp edge, $c'$, at one end, and tines $c$ $c$, &c., at the other, said blade has holes $c^2$ to receive the pivot-bolt, and a projecting piece, E, at either, but preferably at one, edge, which may be provided with a suitable brace, H, if desired, for supporting it. Said piece has holes $e$ $e'$ $e^2$ $e^3$ $e^4$, to receive a pin, $f$, for holding the blade in the desired position. Said pin $f$ passes through a hole, $a^6$, of the arm, and is preferably attached to a spring thumb-piece, or forms a part of the same, so as to be operated with it. Said thumb-piece F is pivoted, $f^2$, and has a suitable spring to raise the back end, preferably a long spring, G, secured at the pivot-point $f^2$ of the thumb-piece, which holds the pin $f$ firmly in place. The blade is pivoted so that when it is used as a spade or shovel the tines will form a support at the back end against the edge $a^3$ of the tongue, while the pin $f$ and the edge $a^8$ make it safe for the foot of the operator, and likewise, when the device is used as a fork, the point of the blade rests against the side $a^4$. Thus the blade can make but one-half of a revolution, and when at the half-way point, or when the pin $f$ is in the middle hole, $e^2$, it forms the rake or hoe, as desired, Fig. 3. This hoe or rake may be made of varying slant, or at a different angle, as desired, by placing the pin in the holes $e'$ or $e^3$. Thus I have a device quickly and easily adjusted for doing the work of the four ordinary tools, and one that is strong and durable.

Having thus described my invention, what I claim as new, and desire to secure by Letters Patent, is—

1. The combination, with a frame, A, having arms $a'$ $a^2$, head $a$, and ferrule B, of a pin, $f$, pivot-bolt D, and a blade, C, having a sharp edge, $c'$, tines $c$, and a projection, E, provided with holes $e$, substantially as shown and described.

2. The combination of a frame, A, provided with arms $a'$ $a^2$, having holes $a^6$ $a^7$, a head, $a$, having a tongue, $a^5$, rabbets $a^3$ $a^4$, with a spring thumb-piece, F, having a pin, $f$, a blade, C, having a sharp edge, $c'$, tines $c$, and projection E, and pins D, all arranged to operate substantially as and for the purpose set forth.

In testimony whereof I affix my signature in presence of two witnesses.

WATSON HESTON.

Witnesses:
J. L. MOORE,
GEO. W. KOONTZ.